United States Patent [19]

Elliott et al.

[11] Patent Number: 5,519,438
[45] Date of Patent: May 21, 1996

[54] COMPUTER WITH A VIDEO SUBSYSTEM THAT CONTAINS TIMERS WHICH ARE USED TO CREATE CALIBRATION TABLES CORRELATING TIME INTERVALS WITH THE DECODING AND CONVERTING OF VIDEO INPUT SIGNALS

[75] Inventors: John D. Elliott, Aloha; Michael J. Gutman, Portland; Rune A. Skarbo, Hillsboro; Kevin A. Watts, Portland, all of Oreg.

[73] Assignee: Intel Corporation, Santa Clara, Calif.

[21] Appl. No.: 269,439

[22] Filed: Jun. 30, 1994

[51] Int. Cl.[6] .................................................. H04N 17/00
[52] U.S. Cl. ........................ 348/180; 348/596; 348/441; 395/157; 345/119
[58] Field of Search ............................ 348/180, 441, 348/596, 384, 739; 345/119, 118; 395/157, 102; H04N 17/00, 7/01

[56] References Cited

U.S. PATENT DOCUMENTS

| | | | |
|---|---|---|---|
| 4,843,468 | 6/1989 | Drewery | 348/441 |
| 5,025,249 | 6/1991 | Seiler et al. | 345/119 |
| 5,367,628 | 11/1994 | Ota et al. | 345/119 |
| 5,373,375 | 12/1994 | Weldy | 348/441 |
| 5,384,598 | 1/1995 | Rodriguez et al. | 348/441 |
| 5,436,641 | 7/1995 | Hoang et al. | 348/596 |

*Primary Examiner*—Victor R. Kostak
*Attorney, Agent, or Firm*—Blakely, Sokoloff, Taylor & Zafman

[57] ABSTRACT

An apparatus and method for modifying the functionality of a computer system based on the dynamically determined operational capabilities of the system is disclosed. The system includes: 1) a video input component for receiving a video input stream including a plurality of video frames encoded in one of a plurality of available video formats; 2) a video decode component coupled to the video input component for decompressing and decoding the video input stream thereby producing a decoded video input stream in a different one of the plurality of available video formats; 3) a video adapter component coupled to the video decode component for converting the decoded video input stream to one of a plurality of available display resolutions; 4) a first timer for measuring a first time interval required by the video decode component to complete decompression and decode of one or more of the video frames of the plurality of video frames; and 5) a second timer for measuring a second time interval required by the video adapter component to complete conversion of the decoded video input stream. The time intervals are stored in calibration tables which can be used to resize a pair of video windows displayed on a video display device.

10 Claims, 7 Drawing Sheets

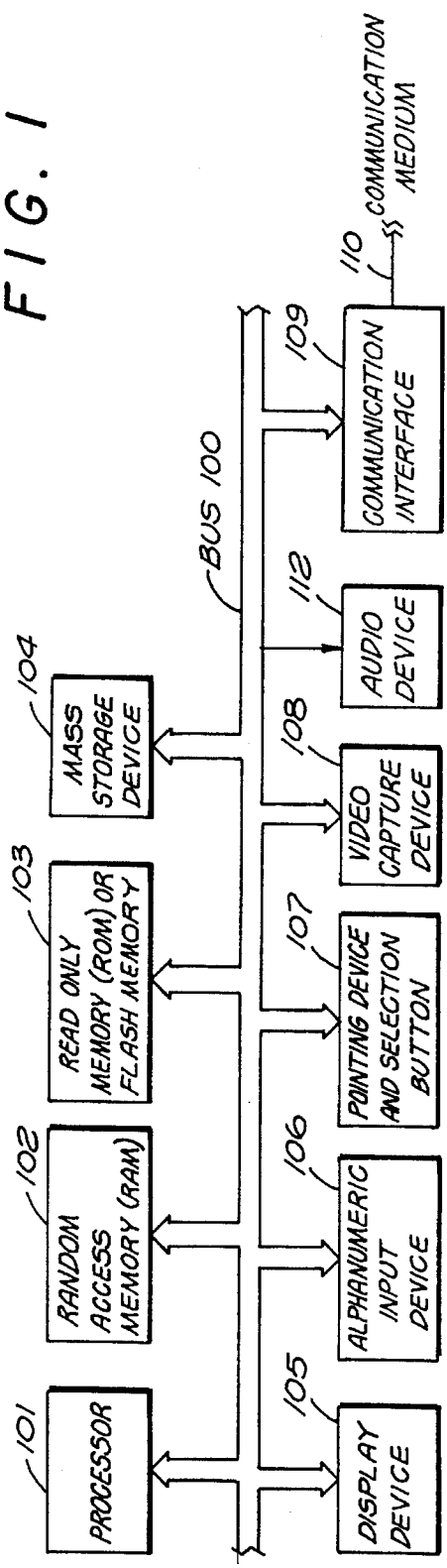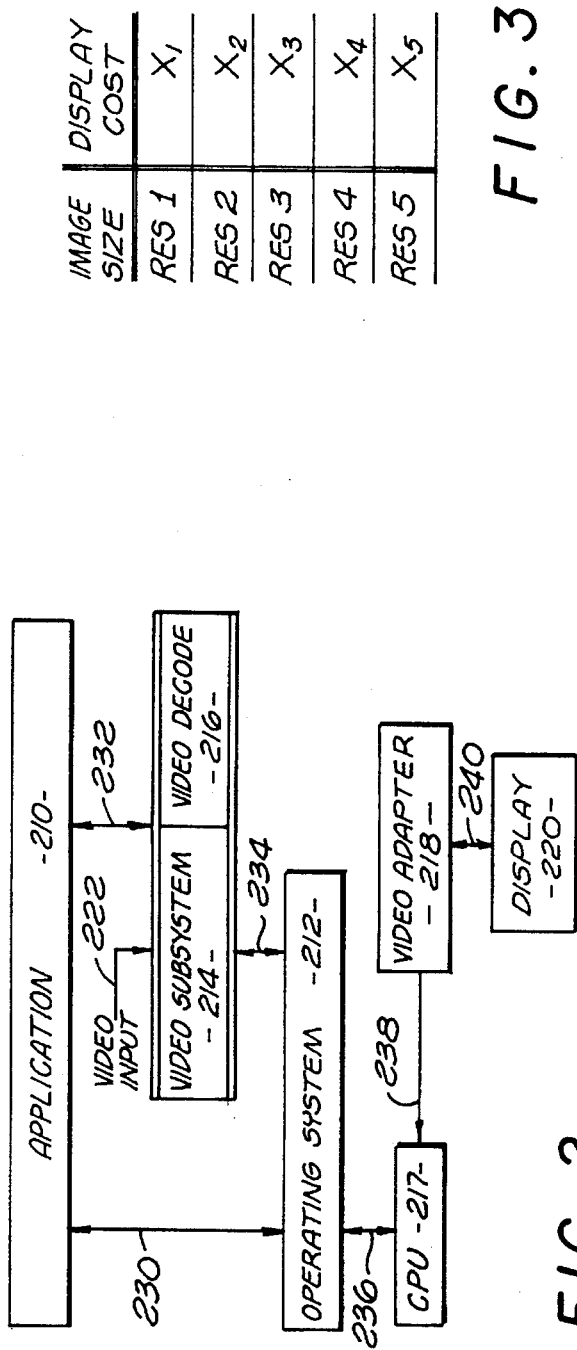

|  | MOST SIMILAR |  |  | LEAST SIMILAR |
|---|---|---|---|---|
| RES 1 | RES 2 | RES 3 | RES 4 | RES 5 |
| RES 2 | RES 3 | RES 4 | RES 5 | RES 1 |
| RES 3 | RES 2 | RES 4 | RES 5 | RES 1 |
| RES 4 | RES 5 | RES 3 | RES 2 | RES 1 |
| RES 5 | RES 4 | RES 3 | RES 2 | RES 1 |

|  | RGB |
|---|---|
| IRV | $Y_1$ |
| YUV (LO RES) | $Y_2$ |
| YUV (HI RES) | $Y_3$ |

} CONVERSION COST

COMPUTER WITH A VIDEO SUBSYSTEM THAT CONTAINS TIMERS WHICH ARE USED TO CREATE CALIBRATION TABLES CORRELATING TIME INTERVALS WITH THE DECODING AND CONVERTING OF VIDEO INPUT SIGNALS

FIELD OF THE INVENTION

The field of the present invention is computer systems. Specifically, the invention relates to computer systems having a video manipulation and display capability.

DESCRIPTION OF RELATED ART

Computer systems, especially personal computer (PC) systems, are sold with a wide range of operational capabilities and feature sets. For example, one PC may use an Intel™ 486 microprocessor while another PC uses a Pentium™ brand microprocessor. The 486 and Pentium marks are trademarks of Intel Corporation of Santa Clara, Calif. A particular application program runs substantially faster on the Pentium based system in comparison to the 486 based system. Other computer systems may be equipped with various peripheral devices that may place additional demands on the computer system central processing unit (CPU). For example, computer systems connected to a network must spend some percentage of CPU time servicing requests and data transfers across the network. Other computer systems supporting video subsystems or video teleconferencing capabilities may experience significant CPU demands during the processing or transfer of video images. In prior art computer systems, a user can activate any available application program or function in a particular computer system. Depending on the capabilities of the particular computer system and the application or function activated, the computer system will either service the requested function promptly or frustrate the user with a sluggish or unpredictably timed response. Prior art systems have been unable to predict and avoid sluggish response. It is ineffective to calibrate a particular application program or system function for operating within a preset response time constraint; because, it is impossible to predetermine the capabilities of the computer systems upon which the application or function will be executed. Similarly, it is ineffective to calibrate a particular computer system for optimally executing a particular type of software; because, it is impossible to predetermine the wide range of software applications or functions that will be executed on a particular computer system.

This problem of maintaining an acceptable response time in computer systems having widely varied operational capabilities is particularly acute in the area of video teleconferencing systems. Video teleconferencing systems must manipulate one or more video images in windows on a typical display screen. Because of the large amounts of data associated with video images, the manipulation of video images is a very CPU intensive operation in systems where the CPU is directly involved in display processing. The load on the CPU increases dramatically as the size of a video window increases. In a typical video teleconferencing application, especially one employing a graphical user interface (GUI), a user is usually allowed to freely resize or move windows on the display screen using a mouse or other pointing device. The user of such an application expects to be allowed to arbitrarily change the size of video windows. However, a particular computer system may not have enough processing power to accommodate such a change, because of the CPU demands that larger video windows place on the system. Specifically, increasing the size of a video window may exceed an acceptable amount of the available processing power of the computer system. If the user is allowed to change the size of a video window without any constraint, the video quality may degrade to an unacceptable level. If two video windows are displayed and a user desires to increase the size of a first one of these video windows, the system could require the user to first reduce the size of the second video window before increasing the size of the first video window. This solution, however is unacceptable from the users perspective. For example, the user would have no idea how small to make the second video window to accommodate the desired increase in the size of the first video window. These problems in prior art computer systems stem from the inability in the prior art to dynamically predetermine the operational capabilities of a computer system and subsequently modify the functionality of the system to optimally accommodate the dynamically determined operational capabilities.

Thus, a better means for dynamically configuring the operational characteristic of a computer system is needed.

SUMMARY OF THE INVENTION

The present invention is an apparatus and method for modifying the functionality of a computer system based on dynamically determined operational capabilities of the system. The present invention includes: 1) a video input component for receiving a video input stream including a plurality of video frames encoded in one of a plurality of available video formats; 2) a video decode component coupled to the video input component for decompressing and decoding the video input stream thereby producing a decoded video input stream in a different one of the plurality of available video formats; 3) a video adapter component coupled to the video decode component for converting the decoded video input stream to one of a plurality of available display resolutions; 4) a first timer for measuring a first time interval required by the video decode component to complete decompression and decode of one or more of the video frames of the plurality of video frames; and 5) a second timer for measuring a second time interval required by the video adapter component to complete conversion of the decoded video input stream. In addition, the present invention includes logic for determining if the second time interval is above a predetermined threshold, logic for automatically reinitiating the video adapter component if the second time interval is above the predetermined threshold, and logic for continuing to test the video adapter component until the second time interval is not above the predetermined threshold or each of the plurality of available display resolutions have been tested. The present invention also includes logic for receiving a user request to resize a first video window, and logic for displaying a second video window in a new display resolution corresponding to a second time interval that is not above the predetermined threshold, the second video window being displayed in the new display resolution automatically in response to the user request.

It is therefore an advantage of the present invention that the operational capabilities of a computer system can be dynamically determined and stored. It is a further advantage of the present invention that the functionality of the system can be modified to optimally accommodate the dynamically determined operational capabilities of the system. It is a further advantage of the present invention that a user action is not allowed to degrade the operation of a computer system below an acceptable level. It is a further advantage of the present invention that a video window can be automatically resized to maintain an acceptable level of computer system performance.

These and other advantages of the present invention will become apparent as illustrated in the figures and described in the following detailed description of the preferred embodiment.

BRIEF DESCRIPTION OF THE DRAWINGS

FIG. 1 illustrates a typical computer system architecture in which the present invention operates.

FIG. 2 illustrates a block diagram of the system components used in the present invention.

FIG. 3 illustrates an example of the video size calibration table of the present invention.

DETAILED DESCRIPTION OF THE PREFERRED EMBODIMENT

Figures 4, 5, 6:
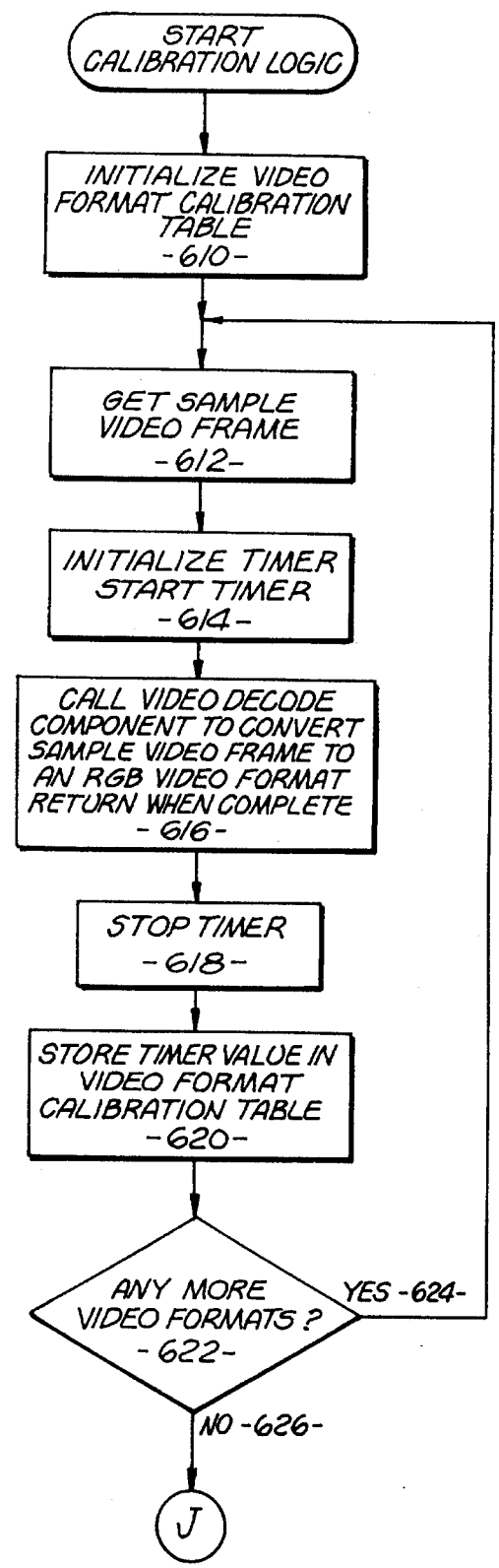
FIG. 4 illustrates an example of the size similarity table of the present invention.
FIG. 5 illustrates an example of the video format calibration table of the present invention.
FIGS. 6–12 are flowcharts illustrating the processing logic of the present invention.

The present invention is an apparatus and method for modifying the functionality of a computer system based on the dynamically determined operational capabilities of the system. In the following detailed description, numerous specific details are set forth in order to provide a thorough understanding of the present invention. However, it will be apparent to one of ordinary skill in the art that these specific details need not be used to practice the present invention. In other circumstances, well known structures, materials, circuits, and interfaces have not been shown or described in detail in order not to unnecessarily obscure the present invention.

Referring now to FIG. 1, a typical computer system architecture in which the present invention operates is illustrated. The computer system comprises a Bus 100 for communicating information between computer system components. These components coupled to Bus 100 include Processor 101. In the preferred embodiment, Processor 101 is an i486™ or Pentium™ brand microprocessor manufactured by Intel™ Corporation, Santa Clara, Calif. The i486 and Pentium marks are registered trademarks of Intel Corporation. Other system components include Random Access Memory (RAM) 102, Read Only Memory (ROM) 103, and mass storage device or disk drive 104. The computer system of the preferred embodiment also includes display device 105 coupled to the Bus 100 for displaying information to a computer user, an alphanumeric input device 106 coupled to the Bus 100 for communicating information and command selections to the Processor 101, a mouse, pointing device, or cursor control device 107 with a selection button coupled to the Bus 100 for communicating information and command selections to Processor 101, a video capture device, camera, recorder, or other video source 108 coupled to the Bus 100 for providing a stream of video image signals, and an optional audio device 112 for capturing and playing back audio signals.

Display device 105 may be a cathode ray tube or other suitable display device for displaying bit mapped graphics on a raster type display. Alphanumeric input device 106 is typically an alphanumeric or function key keyboard. Pointing device or cursor control device 107 is typically a mouse or trackball device allowing the computer user to dynamically signal the two dimensional movement of a visible symbol (i.e. cursor) on the display screen of display device 105. Many implementations of the cursor control device 107 are well known in the art, including trackball, mouse, joystick, or special keys on the alphanumeric input device 106 capable of signaling movement in a given direction. Conventional cursor control device 107 includes a selection button or signal generation device typically implemented as a button or switch located on or near the cursor control device 107. The physical proximity of cursor control device 107 and the signal generation device allows a user to manipulate both functions simultaneously with one hand. The signal generation device may be operated between two control states: an active control state typically initiated by depression of a mouse button, and an inactive control state typically initiated by releasing the mouse button.

The computer system used in the preferred embodiment also includes a communication interface 109. Communication interface 109 is coupled to communication medium 110. Communication interface 109 provides a means for the computer system to communicate with a network of other computer systems. Communication is particularly important in a video teleconferencing system. A variety of conventional networks are well known Local Area Networks (LAN) such as Ethernet, Wide Area Networks (WAN), telephone modem links, or other well known and conventional computer networking technology. The configuration and interconnection of computer system components as illustrated in FIG. 1 is well known to those or ordinary skill in the art.

Referring now to FIG. 2, a block diagram illustrates the system in which the present invention operates. The components identified in FIG. 2 are primarily software components; however, hardware elements within these components support the functionality therein. Central processing unit (CPU) 217, video adapter 218 and display 220 are primarily hardware components.

The system illustrated in FIG. 2 comprises application software 210 which is coupled to operating system software 212 via application program interface (API) 230. Application 210 represents any one of a wide variety of conventional application programs including word processors, spreadsheets, or database application programs. These applications run on operating system software 212. Operating system software 212 represents any of a number of conventional operating systems provided for personal computers. These operating systems include Windows or MS-DOS developed by Microsoft Corporation of Redmond Washington. MS-DOS and Microsoft are trademarks of Microsoft Corporation. Many other such operating systems are well known to those of ordinary skill in the art. Operating system 212 provides a high level set of functions and interfaces for supporting application user requests. Some of these user requests in the preferred embodiment may include the display and manipulation of video windows. Video windows, as defined herein, are conventional computer generated windows in which video image data is displayed. Conventional operating system software 212 provides the functionality necessary to display and manipulate non-video windows. The display and manipulation of video windows, however presents a much more significant challenge, because of the significantly greater amounts of data that are associated with video images. The arbitrary manipulation of video windows, including moving and resizing video windows, as users have come to expect with non-video windows, puts a tremendous processing load upon the central processing unit (CPU) of the computer system in systems where the CPU is directly involved in display processing. In many cases, the processing power for a particular computer system may not support the display of multiple large video windows at one time. In these cases, slow response time results. Thus, the present invention is needed to balance user video window requests with the available processing power needed to support these requests.

The preferred embodiment of the present invention includes video subsystem 214, video decode component 216, and video adapter 218. These components provide low level support for the display of video images in windows on display 220. Video subsystem 214 receives a video input stream 222 that comprises a plurality of individual video flames captured at a particular input capture frame rate and displayed at a particular display frame rate. These video flames, when displayed at the display frame rate, present a full motion video sequence of images on display 220. This image data is encoded into a digital form in video input stream 222 using any one of a variety of video encoding formats as well known to those of ordinary skill in the art. Examples of these prior art video encoding formats include YUV high resolution, YUV low resolution, IRV, and RGB. In a typical video display system, it is often necessary to convert the video input stream 222 data from one video format to a different video format compatible with display device 220. In addition, because of the tremendous amount of data required to define each video frame in video input stream 222, the image data in video input stream 222 is often compressed using any of a variety of well known compression techniques. Because compressed image data can be transferred more quickly across a network, for example, the compression of video input stream 222 is more efficient for transmission of video image data to remote sites. However, when a system such as the system displayed in FIG. 2 receives video input stream 222 in a compressed form, the system must decompress the video input stream prior to displaying the video image data on display 220. Video decode unit 216 is responsible for converting video input stream 222 to a video format selected by video subsystem 214. In addition, video decode component 216 performs the decompression of video input stream 222.

In the preferred embodiment, video decode component 216 receives video input stream 222 from video subsystem 214 in any of three input video formats. These three input video formats in the preferred embodiment are: 1) IRV, 2) YUV (low resolution), or 3) YUV (high resolution). In the preferred embodiment, video decode component 216 converts any one of these input video formats to an RGB output video format for display on display device 220. It will be apparent to one of ordinary skill in the art that any of a variety of other well known input video formats may be equivalently supported by video decode component 216. In addition, video decode component 216 may alternatively be configured to convert an input video format to any of a variety of well known output video formats for compatibility with a particular display device 220. Video decode component 216 outputs the converted and decompressed output video format to video adapter 218 via interface 234, 236, and 238. Video subsystem 214 and video decode component 216 may be implemented as independently loadable software components such as a dynamically linked module or DLL as is well known in the art.

Video adapter 218 provides a means for displaying video image data on display device 220 in any of a variety of display resolutions. In the preferred embodiment of the present invention, five display resolutions are supported: 1) RES 1 corresponds to an icon size portion of the display screen with no motion video therein, 2) RES 2 corresponds to an icon size portion of the display screen showing motion video at two frames per second (fps), 3) RES 3 corresponds to an icon size portion of the display screen showing motion video at ten frames per second (fps), 4) RES 4 corresponds to a portion of the display screen of 160 by 120 pixels at ten frames per second, and 5) RES 5 corresponds to a portion of the display screen of 320 by 240 pixels at ten frames per second. It will be apparent to one of ordinary skill in the art that alternate display resolutions in a particular alternative embodiment may equivalently be supported with the present invention. Video adapter 218 includes well known processing logic for converting a video input stream 222 from one of these available display resolutions to a selectable one of the other display resolutions available. The video image data in the selected display resolution is output by video adapter 218 and displayed on display 220.

Depending upon the video format conversion performed by video decode component 216 and the display resolution generated by video adapter 218, various levels of computer system processing power required to complete the selected conversions. In some selected configurations, the available processing power may be exceeded by the requested video data conversions. The present invention therefore provides a means for determining and configuring the processing power required to complete a conversion from any available input video format to any other available output video format and any generation of one of a plurality of available display resolutions. This means for determining and configuring is provided as processing logic in video subsystem 214 which supports a video cost function available to application 210 by a direct call using interface 232. This video cost function takes as input a capture frame rate, display frame rate, display resolution, video format, and miscellaneous video stream characteristics and outputs a system utilization percentage representing the total system cost for supporting a video decompression and display resolution having the specified characteristics. The video cost function determines this total system cost by accessing a set of calibration tables illustrated in FIGS. 3, 4, and 5. These calibration tables are initialized by calibration logic in video subsystem 214, which is illustrated in the flow charts shown in FIGS. 6 and 7, and described below.

Referring to FIG. 3, the video size calibration table is illustrated. The video size calibration table defines the system utilization percentage representing the system cost (display cost) required for displaying a video window on display 220 in each of five different available display resolutions. It will be apparent to one of ordinary skill in the art that more or less display resolutions may be supported in a particular system. The video size calibration table therefore defines the system cost for displaying a video window in each of a plurality of different available display resolutions. As shown in FIG. 3, a table defines a system cost value for a video window displayed, in the preferred embodiment, in each of five different display resolutions. For example, reading down the left hand column of the table in FIG. 3 to a row identified as RES 3 and then reading across to the column identified as "Display Cost", the video size calibration table of the preferred embodiment defines a system cost value for this sample video window, displayed in as an icon size image at ten fps, to be $X_3$ system cost units. Similarly, other display resolutions of a video window have an associated system cost value defined in the video size calibration table of FIG. 3. It will be apparent to one of ordinary skill in the art that a more complex table may be generated for more than one video window or more than five display resolutions.

Referring now to FIG. 4, a size similarity table is illustrated. In this table, a two dimensional array defines the ordering of display resolutions from a most similar display resolution to a least similar display resolution. As will be described in more detail below, the present invention uses the size similarity table to determine a display resolution configuration most nearly similar to a requested display resolution configuration, yet constrained to a total system cost value less than a predetermined maximum threshold. The video size calibration table of FIG. 3 is initialized by the calibration logic illustrated in FIG. 7. The size similarity table of FIG. 4 is a static table.

Referring to FIG. 5, the video format calibration table of the preferred embodiment is illustrated. The video format calibration table in the preferred embodiment defines the system cost (conversion cost) of converting from an input video format to an RGB output video format. It will be apparent to one of ordinary skill in the art that the video format calibration table of FIG. 5 may be augmented or expanded to include the conversion from other input video formats to other output video formats. The contents of the video format calibration table are initialized by the calibration logic illustrated in FIG. 6.

Referring now to FIG. 6, a flow chart illustrates the processing logic performed by the calibration logic of the preferred embodiment of the present invention. The calibration logic of the present invention comprises software residing physically within random access memory 102 and logically within video subsystem 214. The calibration logic is typically activated upon system initialization or bootup; however, the calibration logic may also be activated at other times. For example, when a system reconfiguration event occurs, such as the insertion or removal of new system hardware, the calibration logic may be activated to appropriately reconfigure video subsystem 214 for the new system hardware. The main function of the calibration logic of the present invention is the dynamic generation of the video size calibration table and the video format calibration table as illustrated in FIGS. 3 and 5. These tables provide a means for storing a value indicating the system cost for displaying video windows in various sizes and video formats.

The calibration logic of the preferred embodiment starts at processing block 610 illustrated in FIG. 6. As the first step in the process, the video format calibration table is initialized to null values in processing block 610. This step may not be necessary in some implementations. Processing block 612 begins a loop where a sample video frame is obtained from video input stream 222. The input sample video frame is coded in a predetermined input video format. In processing block 614, a first timer is initialized and started. Video decode component 216 is called in processing block 616 to convert the input sample video frame to an RGB video format. It will be apparent to one of ordinary skill in the art that video decode component 216 may alternatively convert the input sample video frame to an output video format other than an RGB format. Video decode component 216 returns to processing block 616 upon completion of the conversion of the sample video frame. The first timer started in processing block 614 is stopped in processing block 618 at the completion of the video format conversion process. The timer thereby defines a first interval corresponding to the processor time required to convert from the predetermined input video format to the RGB output video format. This timer value is stored in the video format calibration table in processing block 620. Referring to FIG. 5, the storage of this timer value in the video format calibration table corresponds to the storage of value $Y_1$ in the first row of the table corresponding to the first input video format (IRV).

Referring again to FIG. 6, if any more video formats are supported by a particular system, processing path 624 is taken to processing block 612 where a sample video frame of the next video format type is obtained. In the example of FIG. 5, this next video format is YUV (LO RES). The loop between processing block 612 and decision block 622 is executed again for the second video format. In this second iteration, the value $Y_2$ is stored in the second row of the video format calibration table illustrated in FIG. 5. The process of completely initializing the video format calibration table in this manner continues until the entire table has been initialized. At that point, processing path 626 illustrated in FIG. 6 is taken to the bubble labeled J illustrated in FIG. 7.

Figure 7:
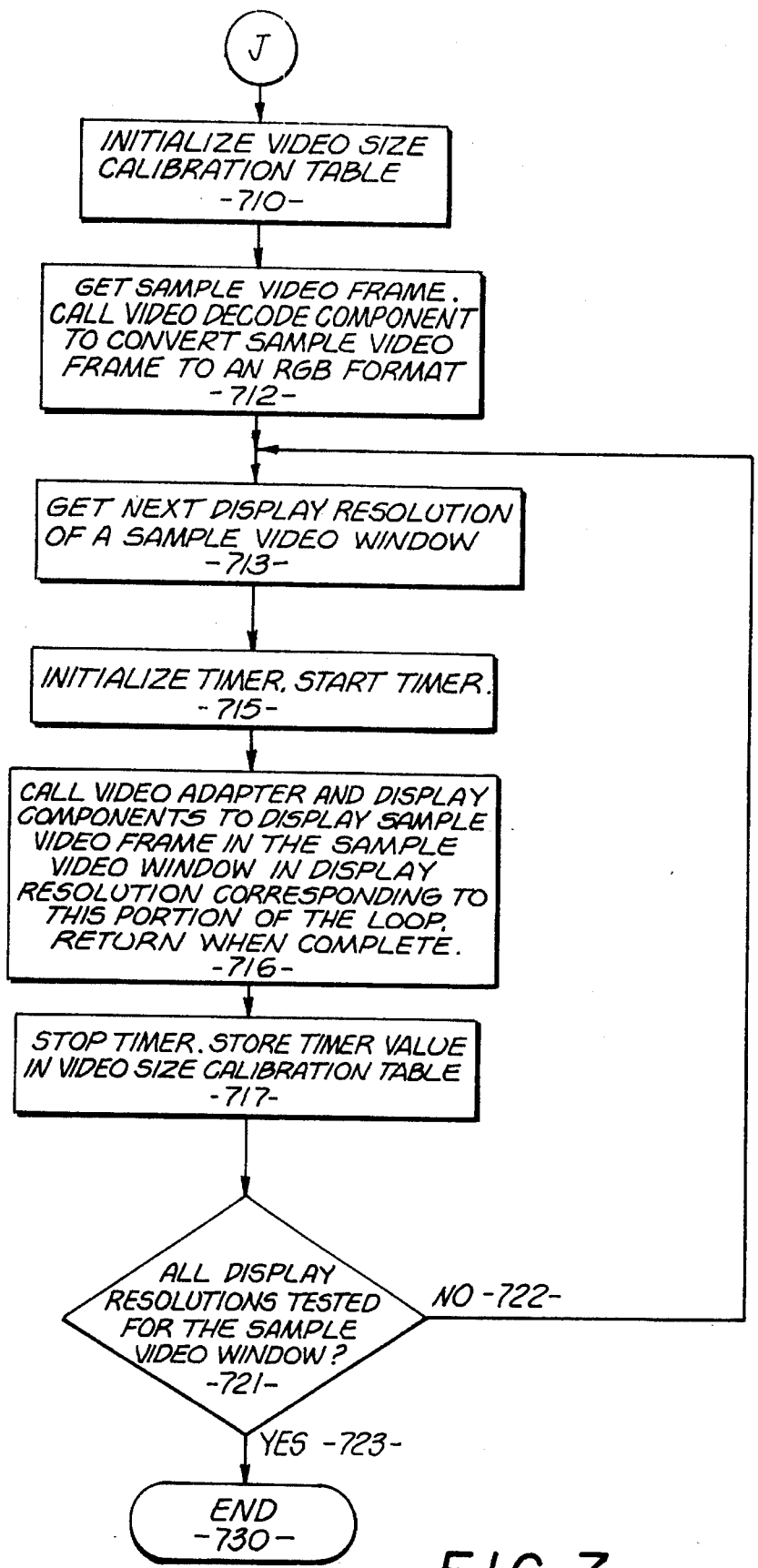

Referring now to FIG. 7, processing for the calibration logic of the present invention continues at the bubble labeled J. The logic illustrated in FIG. 7 initializes the video size calibration table. The video size calibration table is initialized to null values in processing block 710. Again, this step may not be necessary in some implementations. In processing block 712, a sample video frame of a predetermined video format is obtained from video input stream 222. The video decode component 216 is called in processing block 712 to convert the sample video frame to an RGB video format or other suitable output video format compatible with display device 220. Processing block 713 begins a loop where each of the available display resolutions are tested for a video window. By execution of the loop from processing block 713 to decision block 721, each of the available display resolutions are tested in the video window. For each display resolution in the video window, a timer is initialized and started in processing block 715. Video adapter 218 is called in processing block 716 to display the sample video frame in the video window in the display resolution corresponding to the current iteration of the loop. The timer is stopped in processing block 717 after video adapter 218 has displayed the video window in the selected display resolution. At this point, the timer value corresponds to the time required for video adapter 218 to display the video window in the selected display resolution. This timer value therefore corresponds to a system cost associated with displaying the video window in the selected display resolution. This timer value is stored in the video size calibration table at a position corresponding to the display resolution for the video window. Processing continues on processing path 722 for the next display resolution for the video window. When each available display resolution has been tested for the video window, processing path 723 is taken. At this point, the video size calibration table has been completely initialized for all available display resolutions. Processing for the calibration logic of the present invention ends at termination bubble 730 illustrated in FIG. 7.

Once the calibration logic of the present invention has been o executed, normal system processing may be initiated. Having built the video size calibration table and the video format calibration table, using the calibration logic described above, the information in these tables and the information in the size similarity table becomes available for video subsystem 214 during normal operation of the system. The information provided in these tables is used by video subsystem 214 to determine the utilization percentage of the system required to accommodate a selected video window operation as requested by a computer user. For example, when a video window is created, resized, or otherwise modified, video subsystem 214 calls a video cost function (VCOST) which takes as input a capture frame rate, display frame rate, display resolution, video format, and miscellaneous video stream characteristics and outputs a system utilization percentage representing the total system cost for supporting a video decompression and display resolution having the specified characteristics. This video cost function accesses the information in the video size calibration table and the video format calibration table to determine the total system cost for supporting the requested video window operation. This video cost function may therefore be made available to application software 210 directly through interface 232.

FIGS. 8 through 12 illustrate an example of a video window resizing operation that uses this video cost function for determining if the user video window resizing request may be granted or modified to optimally resize the video window without causing system performance to degrade below a predetermined threshold. The example of the present invention starts in FIG. 8 with two video windows (a first and a second video window) having previously been generated on display device 220. In processing block 810, the computer user selects a new size for the first of the two displayed video windows. In prior art systems, the first video window is simply resized to the new size requested by the user. However, the video window resizing operation thus performed may cause system performance to substantially degrade. This is particularly important in video teleconferencing applications where immediate response is critical to all conference participants. The present invention solves this problem by first testing to determine if the new size of the first video window requested by the user is the same as the current size already displayed for the first video window. In this case, the same size video window will incur no system performance penalty and therefore processing control may be transferred on processing path 814 to the bubble labeled A illustrated in FIG. 9 where processing terminates at end bubble 920. If, however, the new video window size selected by the user is not the same as the current size, processing path 816 is taken to processing block 818 where the current video window size of the second video window is obtained. In processing block 820, the size of the second video window closest (i.e. most similar) to its current size is computed to assure that the new size of the first video window does not degrade system performance below a predetermined minimum threshold. The processing performed within processing block 820 is illustrated in more detail in FIGS. 11 and 12.

Figure 11A:
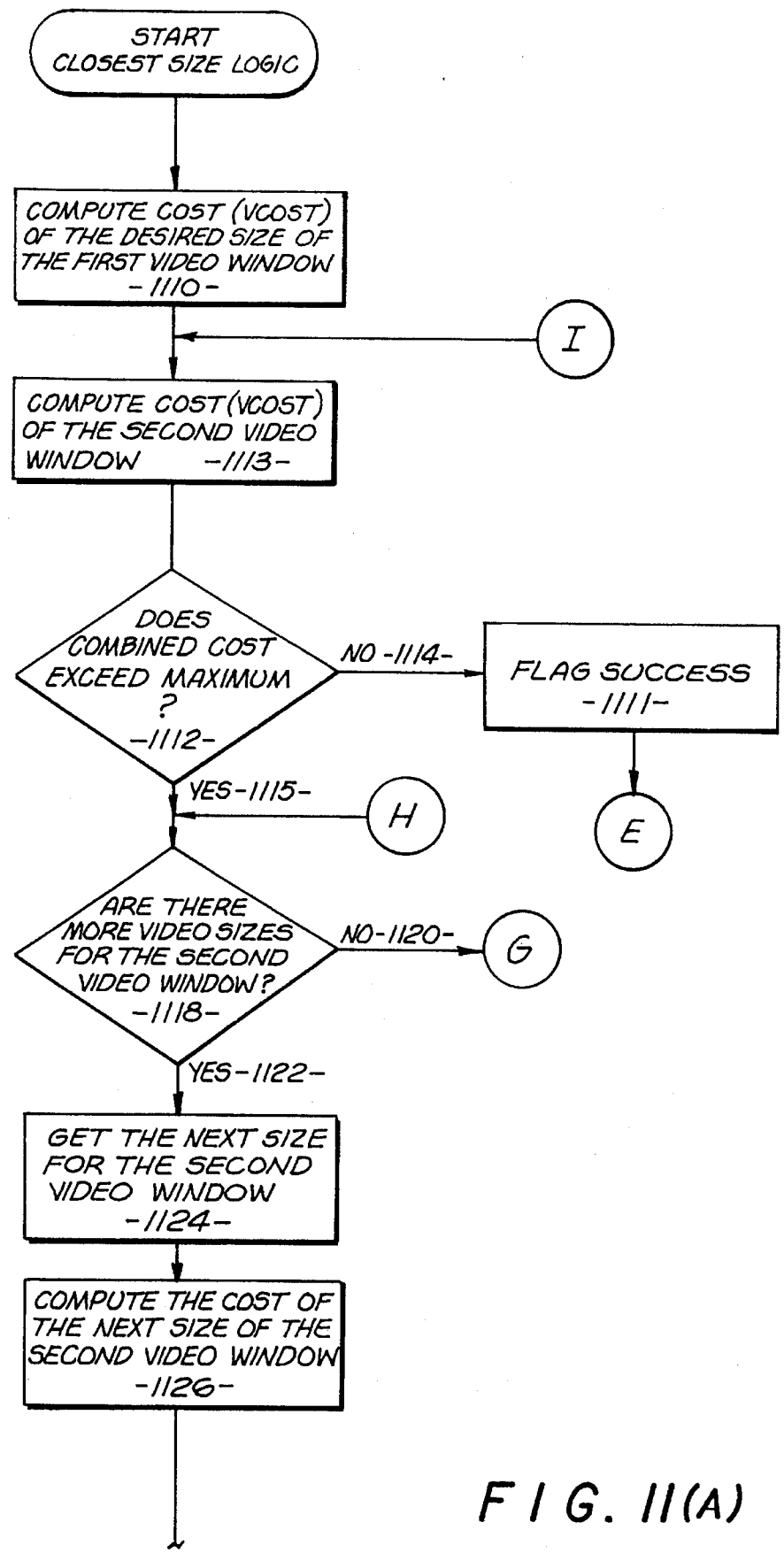
Figure 11B:
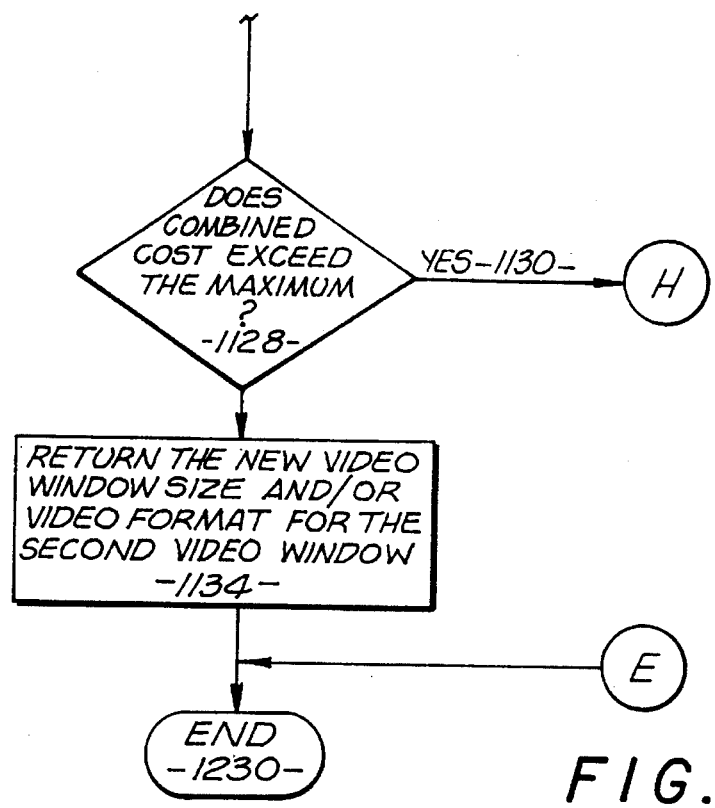

Referring now to FIG. 11, the processing logic for computing a video window size that is closest to a requested size but retaining at least a minimum level of system performance is illustrated. In processing block 1110, the system cost of displaying the first video window in the desired size is computed by accessing the information in the video size calibration table. In processing block 1113, the system cost of displaying the second video window in its current size is computed by accessing the information in the video size calibration table. Given the current display resolution of the second video window and the desired new display resolution of the first video window, the corresponding system cost value for both the first and the second video windows can be computed. If the combined system cost of the first and second video windows does not exceed a predetermined maximum system cost value, processing path 1114 is taken to processing block 1111 where a success condition is flagged and processing terminates through the bubble labeled E illustrated in FIG. 12. If, however, the total system cost of the desired first video window resizing operation exceeds a maximum predetermined level, processing path 1116 is taken to decision block 1118 where a loop is started for each available display resolution (i.e. video window size). For each video window size or display resolution of the second video window, the system cost of generating that size of the second video window is computed in processing block 1126. If the combined system cost for this size of the second video window and the desired size of the first video window exceeds the maximum system cost value, processing path 1130 is taken to the top of the loop through the bubble labeled H for the next available video window size of the second video window. This loop continues until the combined system cost of the current size of the second video window being tested and the desired size of the first video window is below a predetermined maximum system cost threshold (processing path 1132). In this case, the acceptable new video window size and/or the new video window format for the second video window is returned in processing block 1134 and processing terminates through the End bubble 1230 illustrated in FIG. 11. If however, each of the available video window sizes for the second video window is tested and the system cost of none of these video window sizes is below the maximum threshold value, processing path 1120 is taken to the bubble labeled G illustrated in FIG. 12.

Figure 12:
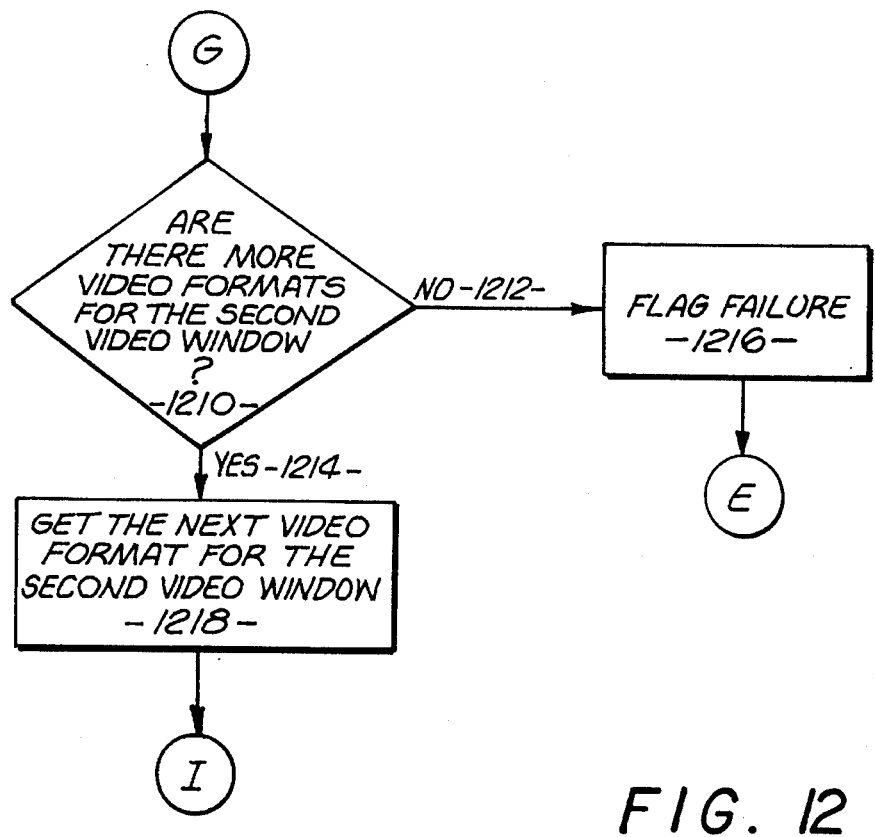

Referring now to FIG. 12, each of the available display resolutions for the second video window have been tested and no acceptable display resolution has been found. In this case, the set of available video formats are tested to determine if the selection of one of the available video formats may bring the system cost of displaying the first and second video windows below the predetermined maximum threshold value. Thus, the processing logic for testing each of the available video formats for the second video window starts at the bubble labeled G illustrated in FIG. 12. For each of the available video formats, the next video format for the second video window is obtained in processing block 1218 and processing continues at the bubble labeled I illustrated in FIG. 11. If, however, each of the available video formats of the second video window are tested and none of the video formats achieve a system cost value below the predetermined maximum threshold value, processing path 1212 is taken to processing block 1216 where a failure condition is flagged and processing terminates through the bubble labeled E illustrated in FIG. 11. Thus, the processing illustrated in FIGS. 11 and 12 determines an optimal display resolution and/or video format for a second video window automatically when a first video window is resized.

Figure 8:
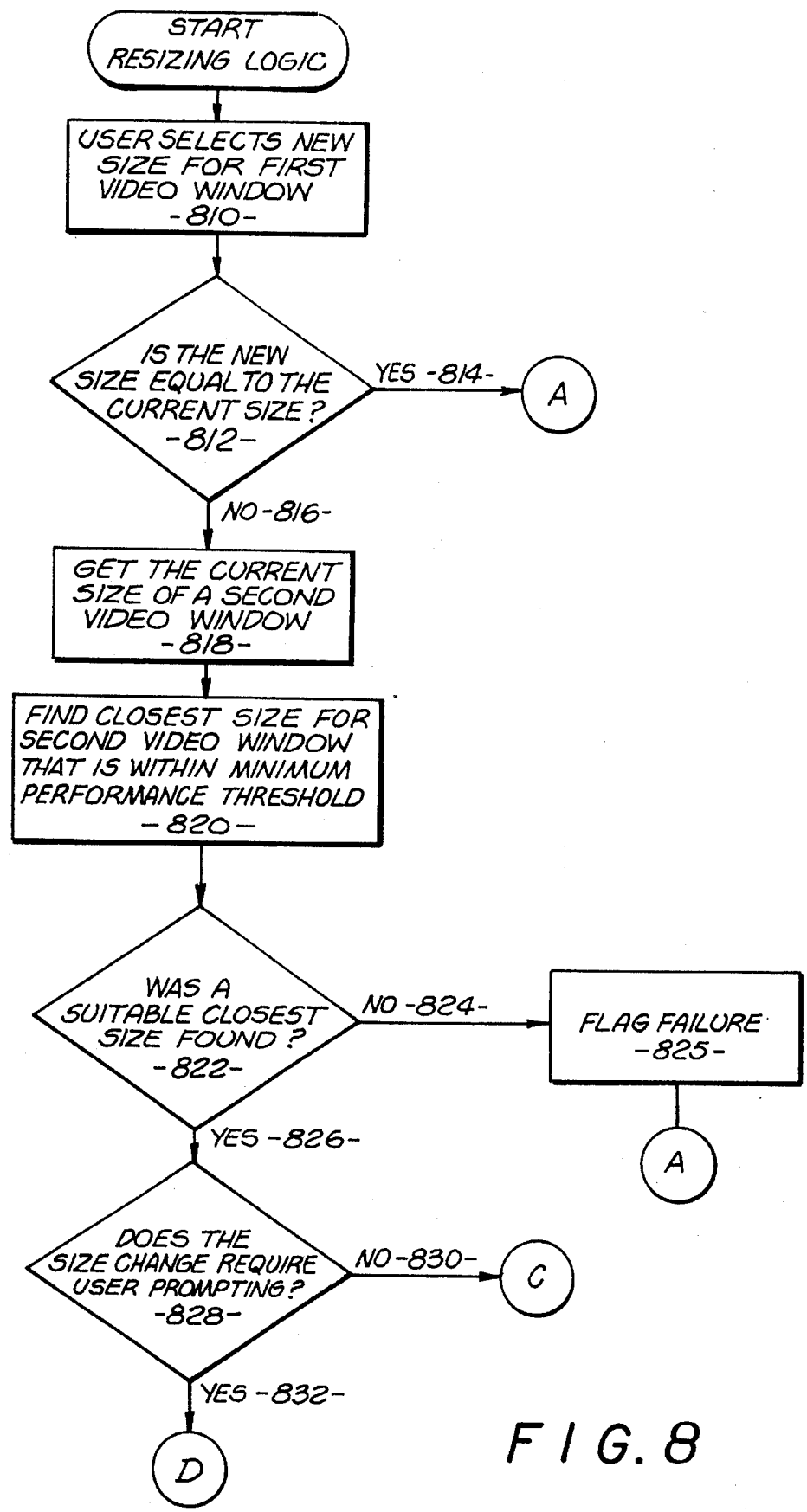

Returning to processing block 820 illustrated in FIG. 8, the closest size and/or video format for the second video window is determined as illustrated in FIGS. 11 and 12 and described above. If a suitable closest size was not found, processing path 824 is taken to processing block 825 where a failure condition is flagged and processing terminates through the bubble labeled A illustrated in FIG. 9. If, however, a suitable closest size was found, processing path 826 is taken to decision block 828. If the automatic resizing of the second video window requires user prompting, processing path 832 is taken to the bubble labeled D illustrated in FIG. 10. If, however, the automatic resizing of the second video window does not require user prompting, processing path 830 is taken to the bubble labeled C illustrated in FIG. 9.

Figure 9:
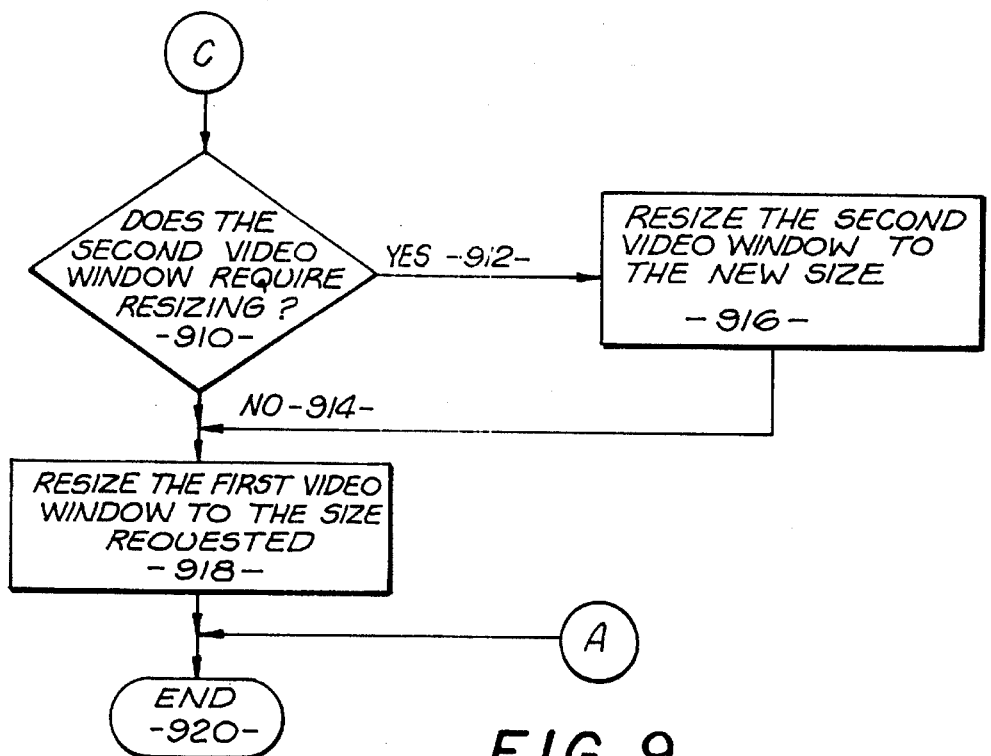

Referring now to FIG. 9, the video window resizing logic of the present invention continues at the bubble labeled C. In this case, the video window size change operation does not require user prompting. If, as a result of the previous computations, the second video window requires resizing, processing path 912 is taken to processing block 916 where the second video window is resized to the previously determined new size. The first video window is then resized to the size requested by the user in processing block 918. In this manner, the sizes of both the first video window and the second video window are modified to accommodate a user resizing request of the first video window, yet retaining at least a minimum level of system performance.

Figure 10:
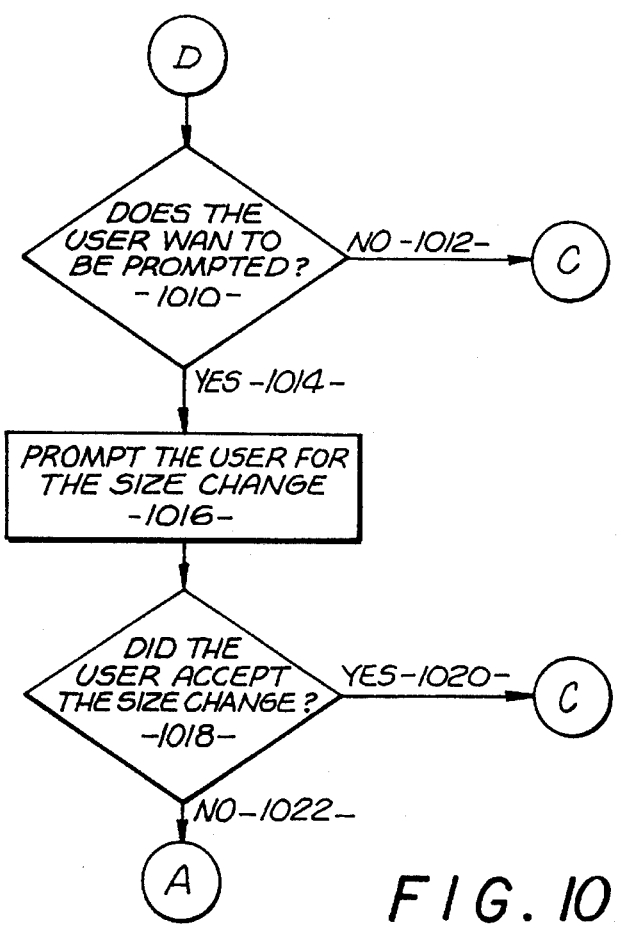

Referring now to FIG. 10, the processing for the video window resizing logic of the present invention continues at the bubble labeled D. In this case, the user size change operation requires user prompting. If the user does not want to be prompted, processing path 1012 is taken to the bubble labeled C illustrated in FIG. 9 where the first and second video windows are resized appropriately. If the user does want to be prompted for the video window size change operation, processing path 1014 is taken to processing block 1016 where the user is prompted for acknowledgment of the window size operation. If the user accepts the size change, processing path 1020 is taken to the bubble labeled C illustrated in FIG. 9 where the resizing of the first and second video windows is accomplished. If, however, the user decides to decline the resizing operation, processing path 1022 is taken to the bubble labeled A illustrated in FIG. 9 where processing terminates with no performance of the window resizing operation.

Thus, the present invention provides a means and a method for automatically resizing video windows to maintain a predetermined level of computer system performance. In addition, an apparatus and method for modifying the functionality of a computer system based on the dynamically determined operational capabilities of the system is disclosed. Although the present invention is described herein with reference to a specific preferred embodiment, many modifications and variations therein will readily occur to those of ordinary skill in the art. Accordingly, all such variations and modifications are included within the intended scope of the present invention as defined by the following claims.

We claim:

1. In a computer system, a video subsystem comprising:

a video input component for receiving a video input stream, said video input stream including a plurality of video frames encoded in one of a plurality of available video formats;

a video decode component coupled to said video input component for decompressing and decoding said video input stream thereby producing a decoded video input stream in a different one of said plurality of available video formats;

a video adapter component coupled to said video decode component for converting said decoded video input stream to one of a plurality of available display resolutions;

a first timer for measuring a first time interval required by said video decode component to complete decompression and decode of one or more of said video frames of said plurality of video frames, said first time interval being stored in a first calibration table that correlates said first time interval with said video format; and a second timer for measuring a second time interval required by said video adapter component to complete conversion of said decoded video input stream, said second time interval being stored in a second calibration table that correlates said second time interval with said display resolution.

2. The video subsystem as claimed in claim 1 further including:

a) logic for determining if said first time interval is above a predetermined threshold;

b) logic for automatically reinitiating said video decode component if said first time interval is above said predetermined threshold; and c) logic for continuing to perform steps a and b until said first time interval is not above said predetermined threshold or each of said plurality of available video formats have been tested.

3. The video subsystem as claimed in claim 1 further including:

a) logic for determining if said second time interval is above a predetermined threshold;

b) logic for automatically reinitiating said video adapter component if said second time interval is above said predetermined threshold; and c) logic for continuing to perform steps a and b until said second time interval is not above said predetermined threshold or each of said plurality of available display resolutions have been tested.

4. The video subsystem as claimed in claim 2 further including:

logic for receiving a user request to reside a first video window; and logic for displaying a second video window in a new video format corresponding to a first time interval that is not above said predetermined threshold, said second video window being displayed in said new video format automatically in response to said user request.

5. The video subsystem as claimed in claim 3 further including:

logic for receiving a user request to resize a first video window; and logic for displaying a second video window in a new display resolution corresponding to a second time interval that is not above said predetermined threshold, said second video window being displayed in said new display resolution automatically in response to said user request.

6. In a computer system, a video system for displaying and manipulating video windows, said video system comprising:

a video subsystem having:

a) a video input component for receiving a video input stream, said video input stream including a plurality of video frames encoded in one of a plurality of available video formats, b) a video decode component coupled to said video input component for decompressing and decoding said video input stream thereby producing a decoded video input stream in a different one of said plurality of available video formats, c) a video adapter component coupled to said video decode component for converting said decoded video input stream to one of a plurality of available display resolutions, d) a first timer for measuring a first time interval required by said video decode component to complete decompression and decode of one or more of said video frames of said plurality of video frames, and e) a second timer for measuring a second time interval required by said video adapter component to complete conversion of said decoded video input stream; and an application program logically coupled to said video subsystem, said application program having logic for receiving a user request to create a first video window and a second video window.

7. The video system as claimed in claim 6 wherein said video subsystem further includes:

a) logic for determining if said first time interval is above a predetermined threshold;

b) logic for automatically reinitiating said video decode component if said first time interval is above said predetermined threshold; and c) logic for continuing to perform steps a and b until said first time interval is not above said predetermined threshold or each of said plurality of available video formats have been tested.

8. The video system as claimed in claim 6 wherein said video subsystem further includes:

a) logic for determining if said second time interval is above a predetermined threshold;

b) logic for automatically reinitiating said video adapter component if said second time interval is above said predetermined threshold; and c) logic for continuing to perform steps a and b until said second time interval is not above said predetermined threshold or each of said plurality of available display resolutions have been tested.

9. The video system as claimed in claim 7 wherein said application program further includes:

logic for receiving a user request to resize said first video window; and logic for displaying said second video window in a new video format corresponding to a first time interval that is not above said predetermined threshold, said second video window being displayed in said new video format automatically in response to said user request.

10. The video system as claimed in claim 8 wherein said application program further includes:

logic for receiving a user request to resize said first video window; and logic for displaying said second video window in a new display resolution corresponding to a second time interval that is not above said predetermined threshold, said second video window being displayed in said new display resolution automatically in response to said user request.

* * * * *

UNITED STATES PATENT AND TRADEMARK OFFICE
CERTIFICATE OF CORRECTION

PATENT NO.    : 5,519,438
DATED         : May 21, 1996
INVENTOR(S)   : Elliott et al.

It is certified that error appears in the above-identified patent and that said Letters Patent is hereby corrected as shown below:

In column 5, at line 19 and again at line 21, delete "flames" and substitute --frames--.

In column 8, at line 61, delete the "o" between "been" and "executed".

In column 12, at line 30, delete "reside" and substitute --resize--.

Signed and Sealed this

Seventh Day of January, 1997

Attest:

BRUCE LEHMAN

Attesting Officer

Commissioner of Patents and Trademarks